(12) United States Patent
Zhang et al.

(10) Patent No.: US 10,213,084 B2
(45) Date of Patent: Feb. 26, 2019

(54) MOBILE APPARATUS, CHASSIS OF MOBILE APPARATUS, AND ANGLE CHANGE METHOD FOR CHASSIS

(71) Applicant: BOE TECHNOLOGY GROUP CO., LTD., Beijing (CN)

(72) Inventors: Ying Zhang, Beijing (CN); Yifei Zhang, Beijing (CN); Kai Zhao, Beijing (CN); Yu Gu, Beijing (CN); Hongli Ding, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/569,261

(22) PCT Filed: May 17, 2017

(86) PCT No.: PCT/CN2017/084690
§ 371 (c)(1),
(2) Date: Oct. 25, 2017

(87) PCT Pub. No.: WO2018/054073
PCT Pub. Date: Mar. 29, 2018

(65) Prior Publication Data
US 2018/0310794 A1 Nov. 1, 2018

(51) Int. Cl.
*A47L 11/40* (2006.01)
*A47L 11/24* (2006.01)
(Continued)

(52) U.S. Cl.
CPC ............. *A47L 11/4061* (2013.01); *A47L 1/02* (2013.01); *A47L 11/24* (2013.01); *A47L 11/28* (2013.01);
(Continued)

(58) Field of Classification Search
CPC ...... B62D 12/00; B62D 12/02; A47L 11/4061
See application file for complete search history.

(56) References Cited

U.S. PATENT DOCUMENTS 4,317,252 A * 3/1982 Knowlton ............... A47L 11/29
15/320
6,837,318 B1 * 1/2005 Craig ..................... B62D 12/00
180/14.1

(Continued)

FOREIGN PATENT DOCUMENTS

CN 104648510 A 5/2015
CN 204644932 U 9/2015
(Continued)

OTHER PUBLICATIONS

Search Report and Written Opinion dated Jul. 27, 2017 from State Intellectual Property Office of the P.R. China.

*Primary Examiner* — Kevin Hurley
(74) *Attorney, Agent, or Firm* — Dilworth & Barrese, LLP; Michael J. Musella, Esq.

(57) ABSTRACT

A mobile apparatus, a chassis for the mobile apparatus and an angle change method for the chassis are provided. The chassis includes: a chassis body including a first body and a second body, with each of the first body and the second body including a bottom surface and a support surface arranged opposite to each other; an angle change device, which is respectively connected with the first body and the second body, disposed between the first body and the second body in an arrangement direction of the first body and the second body, and configured to change an angle between the bottom surfaces of the first body and the second body; and a moving device, configured to move the chassis body.

19 Claims, 7 Drawing Sheets

(51) Int. Cl.
*A47L 1/02* (2006.01)
*B62D 12/02* (2006.01)
*A47L 11/28* (2006.01)
*G05D 1/00* (2006.01)

(52) U.S. Cl.
CPC ........... *A47L 11/40* (2013.01); *A47L 11/4063* (2013.01); *B62D 12/02* (2013.01); *G05D 1/00* (2013.01); *A47L 2201/04* (2013.01)

(56) References Cited

U.S. PATENT DOCUMENTS

| | | | |
|---|---|---|---|
| 9,321,306 B2 | 4/2016 | Outa et al. | |
| 2018/0222528 A1* | 8/2018 | Jagenstedt | ........... A01D 34/008 |

FOREIGN PATENT DOCUMENTS

| | | |
|---|---|---|
| CN | 205306913 U | 6/2016 |
| CN | 206239361 U | 6/2017 |

\* cited by examiner

MOBILE APPARATUS, CHASSIS OF MOBILE APPARATUS, AND ANGLE CHANGE METHOD FOR CHASSIS

TECHNICAL FIELD

Embodiments of the present disclosure relate to a mobile apparatus, a chassis of the mobile apparatus and an angle change method for the chassis.

BACKGROUND

With the rise of smart home, wiping robots (such as sweeping robots and window cleaning robots) have been increasingly applied in people's lives. The sweeping robot mainly adopts a wheel structure to move; the bottom of a chassis of the sweeping robot is equipped with a dust catcher and a wiping device; and the ground cleaning function is mainly achieved by receiving ground debris into an own garbage storage box in the moving process of the chassis. The window cleaning robot generally adopts an adsorption method to keep its chassis on a surface such as a glass and to clean a window by driving a cleaning cloth to wipe a glass during the movement of the chassis.

SUMMARY

Embodiments of the present disclosure provide a mobile apparatus, a chassis of the mobile apparatus and an angle change method for the chassis, and the embodiments of the present disclosure can be applied to a surface with angle change.

At least one embodiment of the present disclosure provides a chassis for a mobile apparatus, and the chassis includes: a chassis body, including a first body and a second body, with the first body including a bottom surface and a support surface arranged opposite to each other, and the second body including a bottom surface and a support surface arranged opposite to each other; an angle change device, respectively connected with the first body and the second body, disposed between the first body and the second body in an arrangement direction of the first body and the second body and configured to change an angle between the bottom surface of the first body and the bottom surface of the second body; and a moving device, configured to move the chassis body.

For example, the angle change device includes: a central part, which is disposed between the first body and the second body, is respectively connected with the first body and the second body, and includes a first central part engaging piece on a side, facing the first body, of the central part; a first body engaging piece, which is connected with the first body and is in a transmission connection with the first central part engaging piece; and a first angle change motor, configured to drive one of the first central part engaging piece and the first body engaging piece to rotate, so that the first body rotates around the central part, and hence the angle between the bottom surface of the first body and the bottom surface of the second body changes.

For example, the angle change device further includes a connection gear which is disposed between the first body engaging piece and the first central part engaging piece and respectively engaged with the first body engaging piece and the first central part engaging piece.

For example, the central part further includes a second central part engaging piece which is on a side, facing the second body, of the central part; and the angle change device further includes: a second body engaging piece which is connected with the second body and is in a transmission connection with the second central part engaging piece; and a second angle change motor configured to drive one of the second central part engaging piece and the second body engaging piece to rotate, so that the second body rotates around the central part, and hence the angle between the bottom surface of the first body and the bottom surface of the second body changes.

For example, the moving device includes: a first adsorption device and a first steering device which are at the first body; and a second adsorption device and a second steering device which are at the second body. The first steering device is configured to allow the first body to rotate around a rotation axis of the first steering device, and the rotation axis of the first steering device is perpendicular to the bottom surface of the first body; and the second steering device is configured to allow the second body to rotate around a rotation axis of the second steering device, and the rotation axis of the second steering device is perpendicular to the bottom surface of the second body.

For example, the first steering device includes a first steering motor, a first transmission part driven by the first steering motor, and a first center transmission part driven by the first transmission part; and the rotation axis of the first steering device is at a center of the first center transmission part.

For example, the first transmission part includes a worm and the first center transmission part includes a worm wheel; or the first transmission part includes a gear wheel and the first center transmission part includes another gear wheel.

For example, the second steering device includes a second steering motor, a second transmission part driven by the second steering motor, and a second center transmission part driven by the second transmission part; and the rotation axis of the second steering device is at a center of the second center transmission part.

For example, the chassis further includes a first sensor region at the first body and a second sensor region at the second body, and each of the first sensor region and the second sensor region is provided with a sensor.

For example, a planar shape of the first sensor region is a circular arc, and a center of the circular arc is at the rotation axis of the first steering device; and/or a planar shape of the second sensor region is a circular arc, and a center of the circular arc is at the rotation axis of the second steering device.

For example, the sensor in each of the first sensor region and the second sensor region is an infrared sensor, a laser radar sensor or a camera.

For example, the moving device includes a roller structure or a conveyer belt structure, which is at the chassis body.

For example, the roller structure includes at least one first roller and at least one second roller, the first roller is at the first body, and the second roller is at the second body; and the conveyer belt structure includes at least one first conveyer belt and at least one second conveyer belt, the first conveyer belt is at the first body, and the second conveyer belt is at the second body.

For example, the chassis further includes an adsorption device, the adsorption device is configured to adsorb the chassis body and a surface for supporting the chassis body together.

For example, the chassis further includes a sensor, and the sensor is at the chassis body.

At least one embodiment of the present disclosure further provides a mobile apparatus including the chassis according to any one of the above embodiments.

At least one embodiment of the present disclosure further provides an angle change method for the chassis according to any one of the above embodiments, and the method includes: detecting an edge of a surface for supporting the chassis and determining a type of the edge; rotating the chassis body to adjust a positional relationship between the edge and a gap between the first body and the second body; and changing the angle between the bottom surface of the first body and the bottom surface of the second body according to the type of the edge.

For example, the angle between the first body and the second body changes before the chassis body arrives at the edge; or the chassis body is rotated after the chassis body arrives at the edge, so that the edge is between the first body and the second body and that an extension direction of the edge is consistent with an extension direction of the gap, and then the angle between the first body and the second body changes.

For example, detecting the edge includes: detecting the edge by sending a detection signal to the surface and receiving a reflected signal; and/or acquiring an image of the surface and detecting the edge according to the image; and/or detecting the edge according to a fact whether movement of the chassis body is blocked.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 1b is a schematic partial detail view of the chassis as shown in FIG. 1a;

DETAILED DESCRIPTION

Figure 1A:
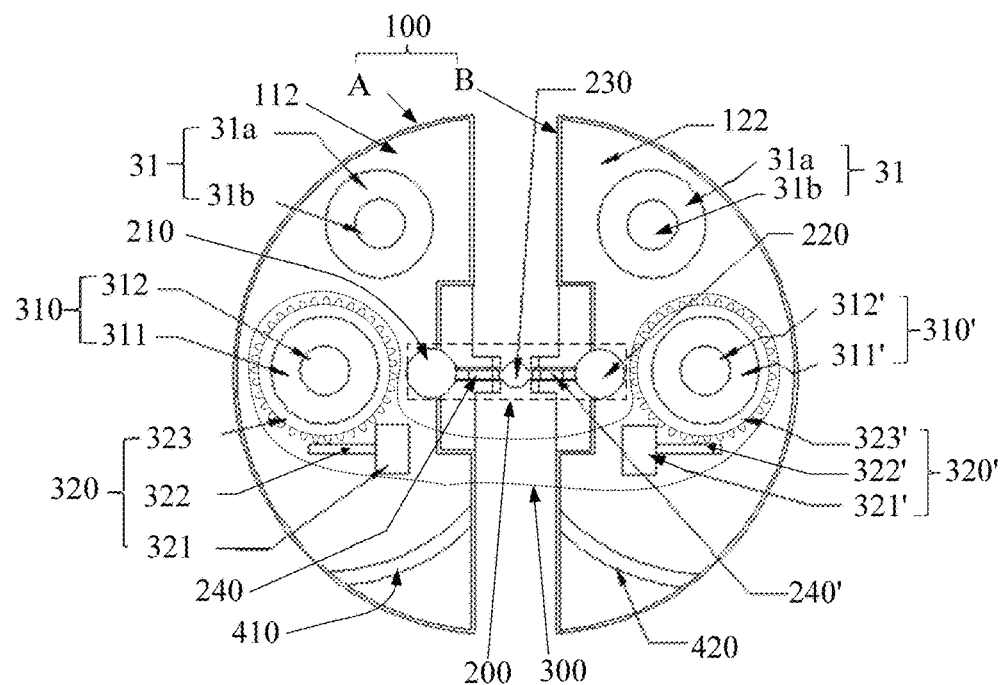
FIG. 1a is a schematic top view illustrating the case that a first body and a second body of a chassis provided by an embodiment of the present disclosure are arranged side by side.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described changes, the relative position relationship may be changed accordingly.

The current wiping robots such as the window cleaning robots and the sweeping robots can wipe limited types of surfaces and cannot wipe surfaces with angle change, for instance, cannot wipe at the edge of a protruding shape such as the edge of a table or at the edge of a recessed shape such as a corner.

Embodiments of the present disclosure provide a mobile apparatus, a chassis for the mobile apparatus, and an angle change method for the chassis. The chassis includes a chassis body, and an angle change device and a moving device which are connected with the chassis body. The chassis body includes a first body and a second body; the first body includes a bottom surface and a support surface arranged opposite to each other; and the second body includes a bottom surface and a support surface arranged opposite to each other. The angle change device is respectively connected with the first body and the second body, disposed between the first body and the second body in the arrangement direction of the first body and the second body, and configured to change the angle between the bottom surface of the first body and the bottom surface of the second body. The moving device is configured to move the chassis body. As the chassis body includes the first body and the second body and the angle between the first body and the second body may change under the action of the angle change device, the embodiments of the present disclosure may be applied to surfaces with angle change, for instance, the edge of a protruding shape such as a table or a wardrobe or the edge of a recessed shape such as a corner, and hence can widen the application range of the mobile apparatus.

Figure 1B:
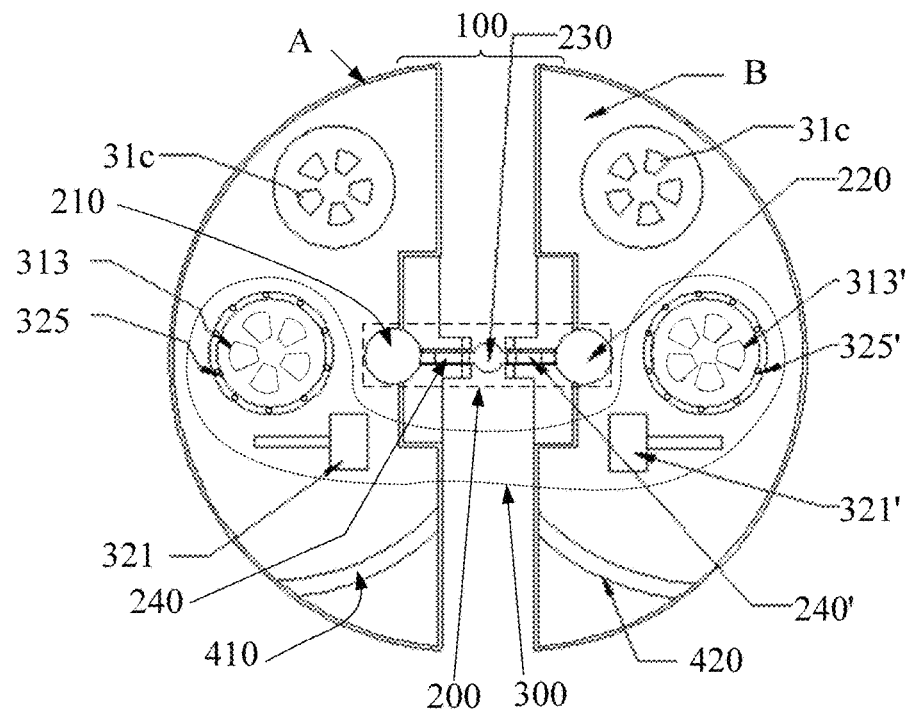
Figure 1C:
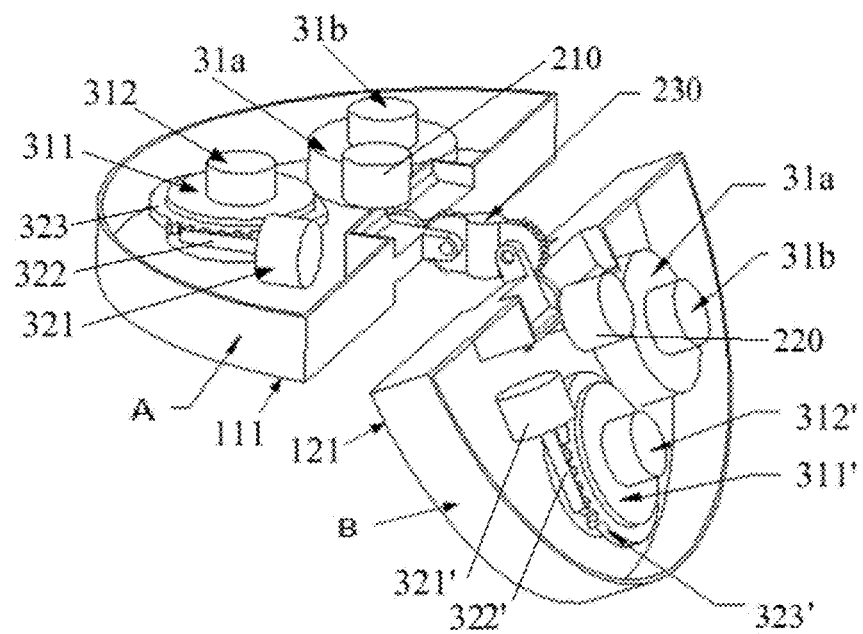
FIG. 1c is a schematic structural view illustrating the case that the angle between the first body and the second body of the chassis provided by an embodiment of the present disclosure changes.

At least one embodiment of the present disclosure provides a chassis for a mobile apparatus. As illustrated in FIGS. 1a to 1c, the chassis includes a chassis body 100, and an angle change device 200 and a moving device 300 which are connected with the chassis body 100. FIG. 1a is a schematic top view illustrating the case that the first body and the second body of the chassis provided by an embodiment of the present disclosure are arranged side by side; FIG. 1b is a schematic view illustrating more details of the chassis as shown in FIG. 1a, in which partial structures in FIG. 1a are not shown in FIG. 1b; and FIG. 1c is a schematic structural view illustrating the case when the angle between the first body and the second body of the chassis provided by an embodiment of the present disclosure changes.

The chassis body 100 includes a first body A and a second body B (the first body and the second body may be arranged side by side as shown in FIG. 1a and may also be not arranged side by side as shown in FIG. 1c). Both the first body A and the second body B are, for instance, in the shape of a semicircle, but the embodiments of the present disclosure are not limited to such shape. Each of the first body A and the second body B includes a support surface (as shown by 112 and 122 in FIG. 1a) and a bottom surface (as shown by 111 and 121 in FIG. 1c). For instance, both the first body A and the second body B of the chassis body 100 may be provided with an accommodating space which is configured to accommodate at least a part of the angle change device 200 and at least a part of the moving device 300.

The angle change device 200 is connected with each of the first body A and the second body B, disposed between the first body A and the second body B in the arrangement direction of the first body A and the second body B, and configured to change the angle between the bottom surfaces 111 and 121 (as shown in FIG. 1c) of the first body A and the second body B. In FIGS. 1a and 1b, the first body A and the second body B are roughly arranged side by side, and an included angle between the bottom surfaces (not shown in FIGS. 1a and 1b) of the first body and the second body is about 0 DEG (degree) or 180 DEG In FIG. 1c, under the action of the angle change device 200 (not shown in FIG. 1c), the included angle between the bottom surfaces 111 and 121 of the first body A and the second body B is greater than 0 DEG and less than 180 DEG It should be noted that the angle change device 200 may drive at least one of the first body A and the second body B to rotate; and the extension direction of a rotation axis is roughly along the extension direction of a gap between the first body A and the second body B (in the embodiments of the present disclosure, the rotation that the rotation axis along such direction is referred to as "vertical rotation").

The moving device 300 is configured to move the chassis body 100. The connecting relationship between the moving device 300 and the chassis body 100 is not limited in the embodiments of the present disclosure. For instance, the moving device 300 may be embedded into the chassis body 100 or mounted on a bottom surface of the chassis body 100, as long as the moving device 300 can move the chassis body 100.

For instance, the modes that the moving device 300 is configured to move the chassis body 100 may include the following cases. For instance, the moving device 300 drives the chassis body 100 to rotate, and a rotation axis is perpendicular to the bottom surface (as shown by 111 or 121 in FIG. 1c) of the chassis body (in the embodiment of the present disclosure, the rotation that the rotation axis along such direction is referred to as "planar rotation"). When the chassis body 100 is close to the edge of a surface (for instance, the edge of a table) for bearing the chassis body 100, the positional relationship between the edge and the gap between the first body A and the second body B may be adjusted by the planar rotation of the chassis body 100, so as to make it easy to change the angle between the first body A and the second body B.

For instance, the mode that the moving device 300 is configured to move the chassis body 100 may also include the following cases. For instance, the moving device 300 drives the chassis body 100 to roughly perform linear motion. The moving device 300 also drives the chassis body 100 to roughly perform linear motion on the basis of driving the chassis body 100 to perform planar rotation, so that the automatic motion of the chassis body 100 can be realized, and hence the automation degree of the mobile apparatus such as a wiping robot can be improved.

Figure 2A:
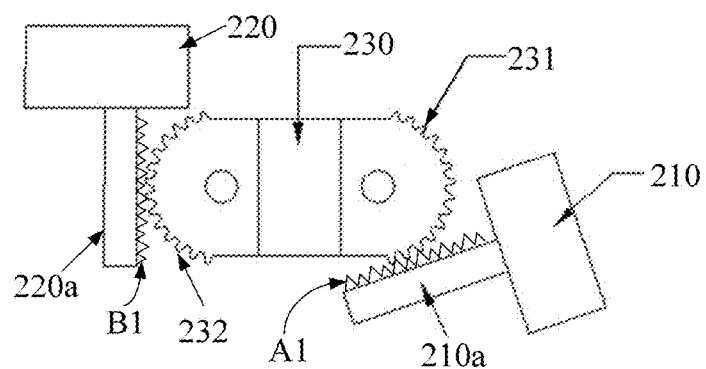
FIGS. 2a and 2b are schematic view illustrating the working principle of an angle change device provided by an embodiment of the present disclosure.
Figure 2B:
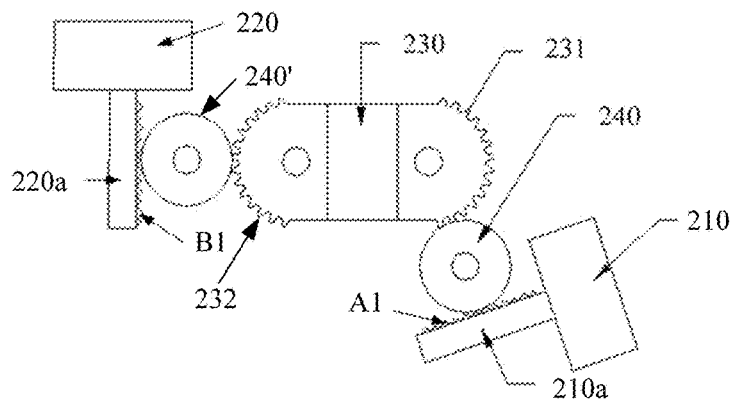

For instance, as shown in FIGS. 1a to 2b, the angle change device 200 includes a central part 230, a first angle change motor (namely a motor for changing the angle) 210 and a first body engaging piece A1 (as shown in FIGS. 2a and 2b). The central part 230 is disposed between the first body A and the second body B and connected with each of the first body A and the second body B (as shown in FIG. 1c), and the central part 230 includes a first central part engaging piece 231 (as shown in FIGS. 2a and 2b) which is disposed on a side, facing the first body (not shown in FIGS. 2a and 2b), of the central part 230. The first body engaging piece A1 is in a transmission connection with the first central part engaging piece 231 and is connected with the first body A. The first angle change motor 210 is configured to drive one of the first central part engaging piece 231 and the first body engaging piece A1 to rotate, so that the first body A can rotate around the central part 230, and hence the angle between the bottom surfaces of the first body A and the second body B can change.

The first body engaging piece A1 and the first central part engaging piece 231 may be directly transmissibly connected, namely directly engaged with each other, as shown in FIG. 2a; or the first body engaging piece A1 and the first central part engaging piece 231 may also be indirectly transmissibly connected. For instance, as shown in FIGS. 1a and 1b, the angle change device 200 further includes a connection gear 240. As shown in FIG. 2b, the connection gear 240 is disposed between the first body engaging piece A1 and the first central part engaging piece 231 and engaged with each of the first body engaging piece A1 and the first central part engaging piece 231. For instance, the first body engaging piece A1 includes helical teeth and the first central part engaging piece 231 includes wheel teeth; or both the first body engaging piece A1 and the first central part engaging piece 231 include wheel tooth.

For instance, as shown in FIGS. 1a to 2b, the angle change device 200 further includes a second angle change motor 220 and a second body engaging piece B1 (as shown in FIGS. 2a and 2b). In this case, the central part 230 further includes a second central part engaging piece 232 which is disposed on a side, facing the second body (not shown in FIGS. 2a and 2b), of the central part 230. The second body engaging piece B1 is connected with the second body and is transmissibly connected with the second central part engaging piece 232. The second angle change motor 220 is configured to drive one of the second central part engaging piece 232 and the second body engaging piece B1 to rotate, so that the second body can rotate around the central part 230, and hence the angle between the bottom surfaces of the first body A and the second body B can change. For instance, the second body engaging piece B1 includes helical teeth and the second central part engaging piece 232 includes wheel teeth; or both the second body engaging piece B1 and the second central part engaging piece 232 include wheel teeth.

Similarly, for instance, the angle change device 200 further includes a connection gear 240' disposed between the second body engaging piece B1 and the second central part engaging piece 232. The connection gear 240' is respectively engaged with the second body engaging piece B1 and the second central part engaging piece 232.

For instance, the angle change device 200 may be a symmetrical structure. For instance, the central part 230 may be a symmetrical structure. For instance, the first central part engaging piece and the second central part engaging piece are symmetrical relative to a central section of the central part 230. For instance, the first angle change motor 210 and the second angle change motor 220 are symmetrical relative to the central part 230.

Detailed description will be given below to the angle change device 200 and the working principle thereof with reference to FIGS. 2a and 2b.

For instance, as shown in FIGS. 2a and 2b, the central part 230 is fixed to the chassis body (namely the central position of the central part 230 is unchanged relative to the chassis body), and the first central part engaging piece 231 is fixed relative to the central part 230. The first angle change motor 210 is connected with the first body (not shown in the figure) and connected with the first body engaging piece A1. For instance, the first body engaging piece A1 may be at a transmission shaft 210a of the first angle change motor 210. Thus, the first body engaging piece A1 and the transmission shaft 210a can form a worm. Correspondingly, the central part 230 in FIG. 2a is taken as a worm wheel, and the connection gear 240 in FIG. 2b is taken as a worm wheel. When the first angle change motor 210 rotates, the transmission shaft 210a begins to rotate, and a rotation axis of the transmission shaft 210a is along the extension direction of the transmission shaft 210a. As the first central part engaging piece 231 is fixed, the first angle change motor 210 drives the first body A connected with the first angle change motor to rotate vertically by the mutual action between the first body engaging piece A1 and the first central part engaging piece 231.

In the embodiment as shown in FIG. 2b, the connection gear 240 may increase the distance between the first angle change motor 210 and the first central part engaging piece 231, so as to avoid the first central part engaging piece 231 from making contact with the first angle change motor 210.

Description is given in FIGS. 2a and 2b by taking the case that the first body engaging piece A1 is connected with the first body through the first angle change motor 2210 and is driven by the first angle change motor 210 to rotate as an example. For instance, the first body engaging piece A1 may also be directly fixed to the first body; the first angle change motor 210 is at the central part 230; and the first body engaging piece A1 may drive the first body to rotate around the central part 230 by allowing the first angle change motor 210 to drive the first central part engaging piece 231 to rotate relative to the center of the central part 230. In this case, the connection gear disposed between the first body engaging piece A1 and the first central part engaging piece 231 can avoid the first central part engaging piece from making contact with the first body.

The means of realizing the vertical rotation of the second body around the central part 230 by utilization of the second angle change motor 220, the second body engaging piece B1 and the second central part engaging piece 232 may refer to FIGS. 2a and 2b and the above description, and no further description will be given here, wherein in FIGS. 2a and 2b, 220a refers to a transmission shaft of the second angle change motor 220.

For instance, the chassis provided by at least one embodiment of the present disclosure may realize travelling or temporary fixing by adsorption means, for instance, travelling or fixing on a wall surface. For instance, as shown in FIGS. 1a and 1b, the moving device 300 includes a first adsorption device 310 disposed at the bottom surface of the first body A and a second adsorption device 310' disposed at the bottom surface of the second body B.

The first adsorption device 310 is configured to adsorb the first body A and the surface for bearing the first body A together. For instance, the first adsorption device 310 may include an induced draught fan 311, an exhaust motor 312 (as shown in FIG. 1a) and at least one aspirating hole 313 (a plurality of aspirating holes are shown in FIG. 1b). The aspirating hole 313 is an opening formed at the bottom surface of the first body A. Under the action of the exhaust motor 312, the induced draught fan 311 begins to work and pump air between the bottom surface of the first body A and the surface for bearing the first body A through the aspirating hole 313, so that the first body A can be adsorbed on the surface.

The second adsorption device 310' is configured to adsorb the second body B and the surface for bearing the second body B together. For instance, the second adsorption device 310' includes an induced draught fan 311', an exhaust motor 312' (as shown in FIG. 1a) and at least one aspirating hole 313' (a plurality of aspirating holes are shown in FIG. 1b). The working principle of the second adsorption device is similar to that of the first adsorption device 310. No further description will be given here.

For instance, the first adsorption device 310 and the second adsorption device 310' are axisymmetrical relative to the gap between the first body A and the second body B. Thus, the chassis can be a symmetrical structure on the whole, which is favorable for the movement of the chassis.

For instance, in order to improve the adsorption force between the chassis body 100 and the surface for bearing the chassis, the chassis provided by at least one embodiment of the present disclosure may further include at least one auxiliary adsorption device 31. For instance, the auxiliary adsorption device 31 may be disposed at each of the first body and second body. The auxiliary adsorption device 31, for instance, includes an induced draught fan 31a, an exhaust motor 31b (as shown in FIG. 1a) and at least one aspirating hole 31c (as shown in FIG. 1b). The working principle of the auxiliary adsorption device 31 is similar to that of the first adsorption device 310. No further description will be given here. For instance, when the adsorption forces of the adsorption devices 310 and 310' are insufficient, the auxiliary adsorption device 31 begins to work, and meanwhile, the chassis stops moving and an alarm program starts.

For instance, in order to allow the chassis to move by adsorption means, the moving device 300 further includes a first steering device 320 disposed at the first body A and a second steering device 320' disposed at the second body B on the basis of including the first adsorption device 310 and the second adsorption device 310'. The first steering device 320 is configured to drive the first body A to rotate around a rotation axis of the first steering device 320, and the rotation axis of the first steering device 320 is perpendicular to the bottom surface of the first body A (not shown in FIGS.

1*a* and 1*b*). The second steering device 320' is configured to drive the second body B to rotate around a rotation axis of the second steering device 320', and the rotation axis of the second steering device 320' is perpendicular to the bottom surface of the second body B (not shown in FIGS. 1*a* and 1*b*).

For instance, the first steering device 320 may be set to drive the first body A to rotate around an adsorption area (an area provided with the aspirating hole 313) of the first adsorption device 310. When the first steering device 320 drives the first body A to rotate, the first adsorption device 310 still maintains an adsorption state, so a fixed rotation axis can be provided. Similarly, the second steering device 320' may be set to drive the second body B to rotate around an adsorption area (an area provided with the aspirating hole 313') of the second adsorption device 310'. When the second steering device 320' drives the second body B to rotate, the second adsorption device 310' still maintains an adsorption state, so a fixed rotation axis can be provided.

For instance, the first steering device 320 and the second steering device 320' are axisymmetrical relative to the gap between the first body A and the second body B. Thus, the chassis can be a symmetrical structure on the whole, which is favorable for the movement of the chassis.

In the embodiments of the present disclosure, the planar rotation of a body and the forward or backward movement of the other body can be realized by control of the simultaneous operation of the adsorption device and the steering device, which are at the same body, of the moving device 300. For instance, when the first adsorption device 310 adsorbs the first body A and the surface for bearing the chassis together, the first steering device 320 controls the planar rotation of the first body A around a rotation center (namely a position where the rotation axis of the first steering device 320 intersects the first body A) of the first steering device 320. In this case, for instance, the width of the gap between the first body A and the second body B is kept unchanged, the second body B is also driven by the first body A to perform a planar rotation around the rotation center, so that the second body B can move forwards or backwards relative to the surface. Similarly, when the second adsorption device 310' adsorbs the second body B and the surface for bearing the chassis together, the second steering device 320' controls the planar rotation of the second body B around a rotation center (namely a position where the rotation axis of the second steering device 320' intersects the second body B) of the second steering device 320', and subsequently, the first body A is driven to perform a planar rotation around the rotation center, so that the first body A can move forwards or backwards relative to the surface. Therefore, the advancing or retreating of the entire chassis can be realized by allowing one of the first body A and the second body B to be in an adsorption state and the other one to be in a non-adsorption state in the working process of the moving device 300, and allowing the first body A and the second body B to be in the adsorption state alternately, for instance, during the alternation process of both, after it is determined that the state of one body is switched from the non-adsorption state to the adsorption state, the other body is switched from the adsorption state to the non-adsorption state.

For instance, as shown in FIG. 1*a*, the first steering device 320 includes a first steering motor 321, a first transmission part 322 driven by the first steering motor 321, and a first center transmission part 323 driven by the first transmission part 322. The rotation axis of the first steering device 320 is at the center of the first center transmission part 323. For instance, the second steering device 320' includes a second steering motor 321', a second transmission part 322' driven by the second steering motor 321', and a second center transmission part 323' driven by the second transmission part 322'. The rotation axis of the second steering device 320' is at the center of the second center transmission part 323'.

For instance, in one example, as shown in FIG. 1*a*, the first transmission part 322 is a worm and the first center transmission part 323 is a worm wheel; or the first transmission part 322 is a gear wheel and the first center transmission part 323 is also a gear wheel.

For instance, both the steering motors 321 and 321' and the center transmission parts 323 and 323' are fixed at the chassis body 100. Moreover, the first body A is provided with a bearing 325 between an area provided with the steering motor 321 and an area provided with the center transmission part 323 (as shown in FIG. 1*b*). The second body B is provided with a bearing 325' between an area provided with the steering motor 321' and an area provided with the center transmission part 323' (as shown in FIG. 1*b*). When the first adsorption device 310 is in the adsorption state and the first steering motor 321 rotates, the first steering motor 321 drives the first transmission part 322 to rotate. Due to the interaction between the first transmission part 322 and the first center transmission part 323, as the first center transmission part 323 is disposed at the adsorption area of the first adsorption device 310, the first steering motor 321 drives the first body A to rotate around the center of the first center transmission part 323. Similarly, when the second adsorption device 310' is in the adsorption state and the second steering motor 321' rotates, the second center transmission part 323' drives the second body B to rotate around the center of the second center transmission part 323'.

For instance, as shown in FIGS. 1*a* and 1*b*, the chassis provided by at least one embodiment of the present disclosure may further include a first sensor region 410 disposed at the first body A and a second sensor region 420 disposed at the second body B. Each of the first sensor region 410 and the second sensor region 420 is provided with a sensor, e.g., an infrared sensor, a laser radar sensor or a camera, so as to detect whether the angle at the surface for bearing the chassis changes or not. The setting means of the sensor at the corresponding body is not limited in the embodiments of the present disclosure. Taking the detection of the edge of a table as an example, when the sensor adopts an infrared sensor or a laser radar sensor, for instance, the sensor may transmit a signal to a position under the chassis and receive a reflected signal during the movement of the chassis, and a signal reflected by a surface of the table is stronger than a signal reflected by a surface for bearing the table (e.g., the ground), so the edge of the table can be detected according to the intensity variation of the reflected signal. When the sensor adopts a camera, for instance, the sensor may acquire an image of a surface below the chassis in the travelling process of the chassis, and the edge of the table may be detected according to the captured image.

For instance, the planar shape of the first sensor region 410 is a circular arc, and the center of the circular arc is at the rotation axis of the first steering device 320 (namely coincident with the rotation center of the first body A); and/or the planar shape of the second sensor region 420 is a circular arc, and the center of the circular arc is at the rotation axis of the second steering device 320' (namely coincident with the rotation center of the second body B). Thus, the gap between A and B can be coincident with the detected edge and has a roughly same extension direction, so as to make it easy to change the angle between A and B.

On one hand, as the chassis provided by the embodiments of the present disclosure includes the first and second adsorption devices, the chassis may be applied in an environment requiring wall climbing (e.g., a window cleaning robot). On the other hand, in the embodiments of the present disclosure, the chassis is divided into two parts and each part is provided with an adsorption device and a steering device to realize the movement of the chassis, so that the chassis not only can work on a surface with angle change but also can move from one surface to another surface with different angles, and hence can be applicable to more wiping environments.

Description will be given below to the angle change process of the chassis as shown in FIGS. 1a to 1c with reference to FIGS. 3a-3d and 4a-4d by taking the edge of a protruding shape (e.g., the edge of a table) as an example. In FIGS. 3a to 3d, 022 refers to a horizontal plane and 021 refers to a vertical plane. In FIGS. 4a to 4d, a cross indicates a rotation center and a heavy line indicates an edge, for instance, the edge of the table.

Figure 3A:
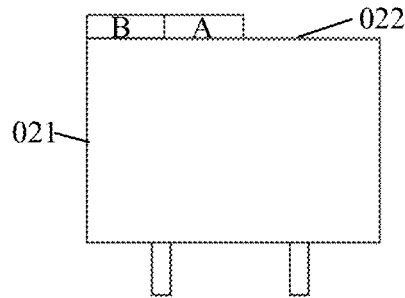
FIGS. 3a to 3d are schematic views illustrating the case that the angle of the chassis provided by an embodiment of the present disclosure changes at the edge of a protruding shape.
Figure 3B:
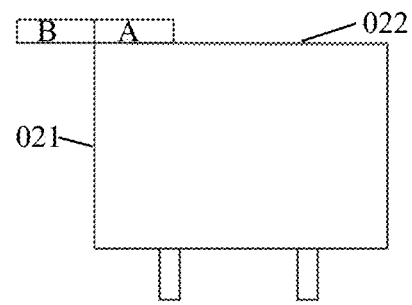
Figure 3C:
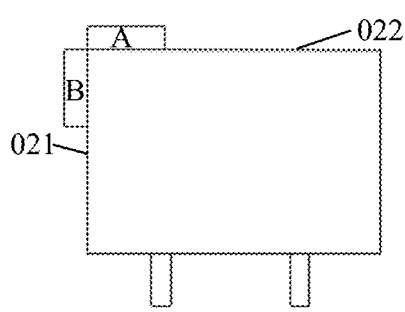
Figure 3D:
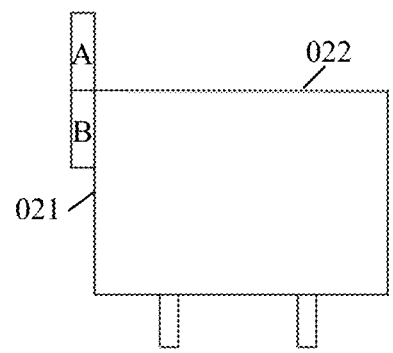

As shown in FIG. 3a, before the chassis arrives at the edge between the horizontal plane 022 and the vertical plane 021, A and B are arranged side by side, so that the chassis can be disposed on the horizontal plane 022 in a planar working state. After the edge is detected, as shown in FIG. 3b, the chassis is adjusted so that the gap between A and B can be coincident with the edge, B being disposed outside the horizontal plane 022, A being adsorbed to the horizontal plane 022. Then, as shown in FIG. 3c, B is rotated counterclockwise for 90 DEG and is adsorbed to the vertical plane 021. Afterwards, as shown in FIG. 3d, A is rotated counterclockwise for 90 DEG, so that A and B are arranged side by side, and thus the chassis restores the planar working state and moves along the vertical plane 021.

Figure 4A:
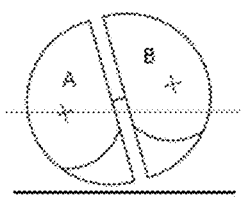
FIGS. 4a to 4d are schematic top views illustrating the movement state of the chassis provided by an embodiment of the present disclosure at the edge of the protruding shape.
Figure 4B:
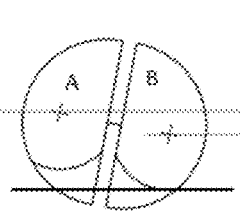
Figure 4C:
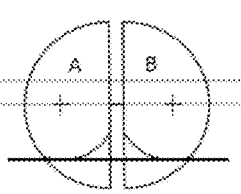
Figure 4D:
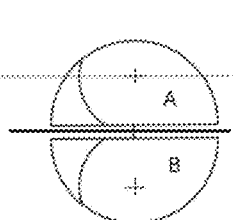

As shown in FIG. 4a, when the chassis moves towards the edge and does not arrives at the edge, one of A and B is in the adsorption state and the other is in the non-adsorption state. For instance, when A is in the adsorption state and the steering device of A operates (hereafter referred to as "A rotates"), B is driven by A to rotate around the rotation center of A (as shown by the cross in A) and moves towards the edge, so the chassis moves to the state as shown in FIG. 4b. Subsequently, the adsorption states of A and B are changed, so that B is in the adsorption state and the steering device of B operates (hereafter referred to as "B rotates"), and hence the chassis can move from the state as shown in FIG. 4b to the state as shown in FIG. 4c. In FIG. 4c, the gap between A and B is roughly perpendicular to the extension direction of the edge. Moreover, for instance, the sensor regions (as shown by arcs in the figure) of A and B are both roughly tangent to the edge. Subsequently, the adsorption states of A and B are switched again, so that A is in the adsorption state and is driven to rotate for 90 DEG, and hence the chassis can move from the state as shown in FIG. 4c to the state as shown in FIG. 4d. In FIG. 4d, the gap between A and B overlaps the edge and has roughly the same extension direction as the edge.

It can be seen from FIGS. 4a and 4b, in the process that the chassis moves from the state as shown in FIG. 4a to the state as shown in FIG. 4b, the position of the rotation center of A to the edge is unchanged (as shown by a connecting line between the rotation centers of A in FIGS. 4a and 4b); in the process that the chassis moves from the state as shown in FIG. 4b to the state as shown in FIG. 4c, the position of the rotation center of B to the edge is unchanged (as shown by a connecting line between the rotation centers of B in FIGS. 4b and 4c); and in the process that the chassis moves from the state as shown in FIG. 4c to the state as shown in FIG. 4d, the position of the rotation center of A to the edge is unchanged (as shown by a connecting line between the rotation centers of A in FIGS. 4c and 4d).

As shown in FIGS. 4c and 4d, in the situation where the planar shape of the first sensor region (as shown by an arc in A) is a circular arc and the center of the circular arc is coincident with the rotation center of A, the radius of the circular arc is set to be roughly the same with the distance from the rotation center of A to the edge when the angle of the chassis changes for 90 DEG, so that the gap between A and B can be coincident with the edge and has roughly the same extension direction as the edge in the process that the chassis rotates from the state as shown in FIG. 4c to the state as shown in FIG. 4d, and hence it is facilitated to change the angle between A and B. When the planar shape of the second sensor region (as shown by an arc in B) is a circular arc, the radius of the circular arc may also be set in a similar way.

In the above embodiments, the moving device changes the movement state of the chassis by adsorption means. For instance, in at least other embodiments of the present disclosure, the moving device may include a roller structure or a conveyer belt structure disposed at the chassis body, so as to change the movement state of the chassis.

Figure 5A:
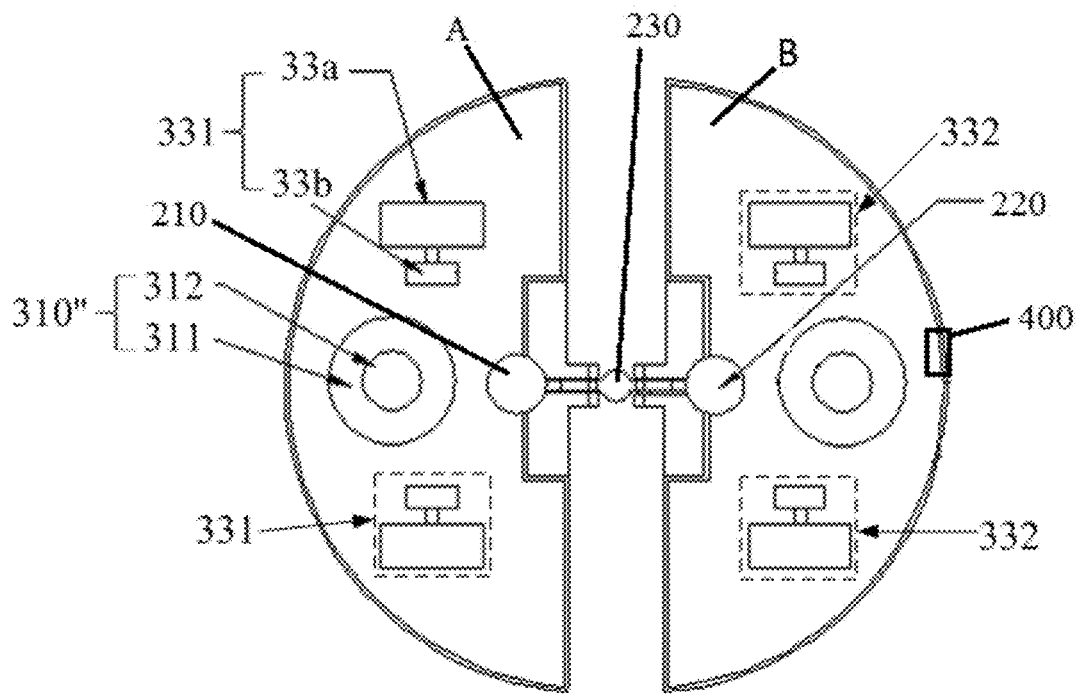
FIGS. 5a and 5b are schematic top views illustrating the case that the first body and the second body of the chassis provided by an embodiment of the present disclosure are arranged side by side.

For instance, as shown in FIG. 5a, the roller structure may include at least one first roller 331 and at least one second roller 332; the first roller 331 is disposed at the first body A; and the second roller 332 is disposed at the second body B. For instance, as shown in FIG. 5a, the first body A may be provided with at least two first rollers 331, so that the rotation of the first body A can be conveniently controlled. Similarly, for instance, the second body B may also be provided with at least two second rollers 332. For instance, each of the first roller 331 and the second roller 332 may include a roller body 33a and a driving motor 33b for driving the roller body 33a to move.

Figure 5B:
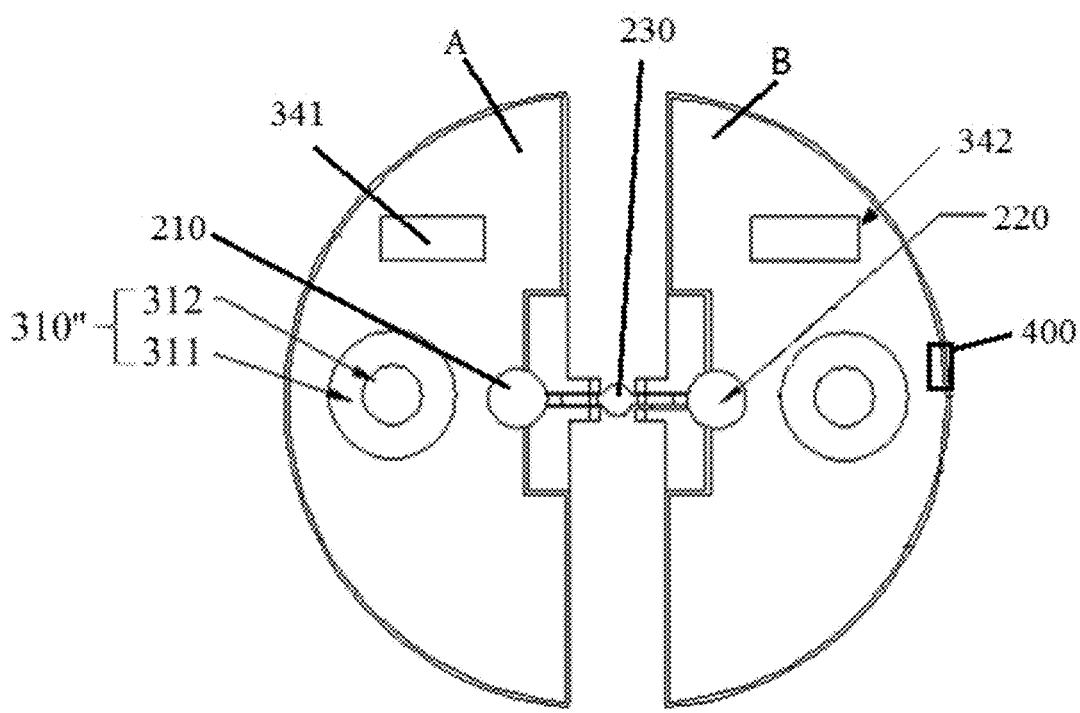

For instance, as shown in FIG. 5b, the conveyer belt structure may include at least one first conveyer belt 341 and at least one second conveyer belt 342; the first conveyer belt 341 is disposed at the first body A; and the second conveyer belt 342 is disposed at the second body B.

For instance, as shown in FIGS. 5a and 5b, the chassis provided by at least one embodiment of the present disclosure may further include an adsorption device 310" which is configured to adsorb the chassis body and the surface for bearing the chassis together. The adsorption device 310", for instance, includes an induced draught fan 311, an exhaust motor 312 and an aspirating hole (not shown in the figure). The operating mode of the adsorption device 310" may refer to the description related to the first adsorption device 310. No further description will be given here. For instance, in a situation where the chassis as shown in FIGS. 5a and 5b does not include the adsorption device, the chassis may be used in situations not requiring an adsorption function, e.g., a sweeping robot. For instance, in a situation where the chassis includes the adsorption device 310", the chassis may be applied in situations requiring an adsorption function, e.g., wall climbing, for instance, may be applied in a window cleaning robot.

For instance, as shown in FIGS. 5a and 5b, the chassis provided by at least one embodiment of the present disclosure may further include a sensor 400 which is disposed at the chassis body 100. The setting means of the sensor at the chassis body 100 is not limited in the embodiments of the present disclosure. For instance, the chassis may be disposed on the chassis body 100 or be embedded into the chassis body 100. The shape of the surface for bearing the chassis may be detected by arrangement of the sensor, so as to determine whether the angle of the surface changes or not.

For instance, the sensor 400 may be an infrared sensor, a laser radar sensor or a camera. For instance, the sensor 400 may be used for detecting the edge of a protruding shape, e.g., the edge of a table. In this case, the setting means of the sensor 400 may refer to the description on the sensors respectively in the first and second sensor regions. No further description will be given here. For instance, in a situation where the sensor 400 is used for detecting a recessed shape such as a corner, the sensor 400 may be configured to transmit a signal to the side in front of the chassis and to receive a reflected signal in the movement process of the chassis, so as to measure the distance from the sensor to, for instance, the wall, and hence detect the edge; or the sensor 400 may detect the edge by shooting an image in front of the chassis. As for the recessed shape such as a corner, the edge of the corner may also be detected according to the fact whether the chassis can advance continuously.

Description will be given below to the angle change process of the chassis as shown in FIGS. 5*a* and 5*b* with reference to FIGS. 6*a*-6*e* and 7*a*-7*b* by taking the edge of a recessed shape (for instance, a corner) as an example. In FIGS. 6*a* to 6*e*, 01 refers to a horizontal plane and 03 refers to a vertical plane. In FIGS. 7*a* and 7*b*, a cross indicates a rotation center and a heavy line indicates the edge.

Figure 6A:
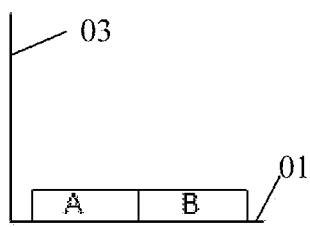
FIGS. 6a to 6e are schematic views illustrating the case that the angle of the chassis provided by an embodiment of the present disclosure changes at the edge of a recessed shape.
Figure 6B:
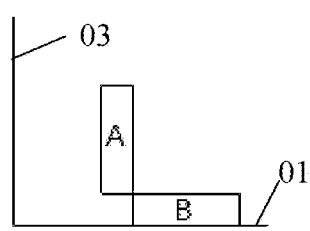
Figure 6C:
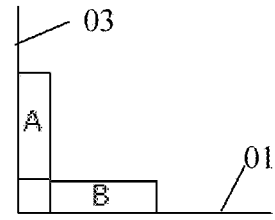
Figure 6D:
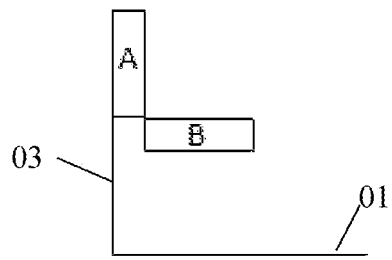
Figure 7A:
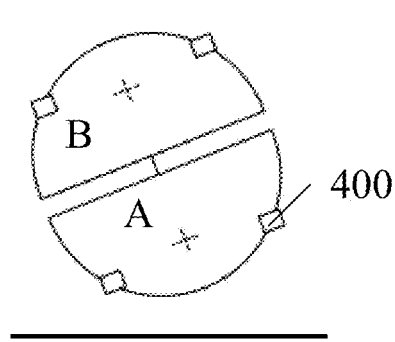
FIGS. 7a and 7b are schematic top views illustrating the movement state of the chassis provided by an embodiment of the present disclosure at the edge of the recessed shape.
Figure 7B:
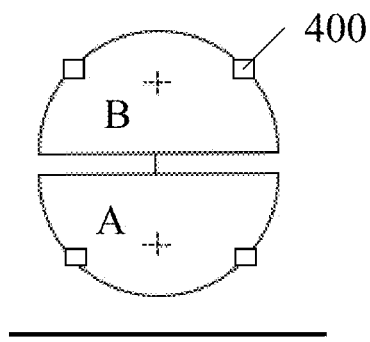

As shown in FIGS. 6*a* and 7*a*, before the chassis arrives at the edge between the vertical plane 03 and the horizontal plane 01, A and B are arranged side by side on the horizontal plane 01. After the edge is detected and before the chassis arrives at the edge, as shown in FIG. 7*b*, the gap between A and B is adjusted to have a roughly same extension direction with the edge by the planar rotation of the chassis. As shown in FIG. 6*b*, an included angle between A and B changes, so that A can be roughly parallel to the vertical plane 03. Subsequently, the moving device on the B side is driven to allow the chassis to move forwards. When the chassis arrives at the edge, as shown in FIG. 6*c*, as the forward motion of the chassis is prevented, the current of the motor in the moving device on the B side is increased, and it can be determined that the chassis arrives at the edge. As shown in FIG. 6*d*, A is adsorbed to the vertical plane 03 and moves upwards for a certain distance along the vertical plane 03, for instance, A moves until the distance from A to the horizontal plane 01 is greater than the size of B. Subsequently, the included angle between A and B changes, so that A and B can be arranged side by side along the vertical plane 03, and hence the chassis can restore the planar working state.

In FIG. 7*b*, for instance, two sensors 400 are arranged at the front end (an end away from B) of A, for instance, a connecting line of the two sensors 400 may be roughly parallel to the extension direction of the gap between A and B. Thus, when the two sensors detect the edge and detected values are equal, the gap between A and B is roughly parallel to the edge. Similarly, two sensors 400 may be disposed at the front end (namely an end away from A) of B.

It should be noted that the mounting means of components, e.g., the angle change motor, the adsorption devices, the steering devices and the sensors, at the chassis body are not limited in the embodiments of the present disclosure. For instance, the components may be embedded into the chassis body or mounted on the surface of the chassis body as required.

In the embodiments of the present disclosure, as the angle between the first body and the second body of the chassis may change, both the chassis which realizes movement by adsorption means and the chassis which realizes movement by the roller structure or the conveyer belt structure may be used in application environments with angle change such as the protruding shape and the recessed shape.

At least one embodiment of the present disclosure further provides a mobile apparatus, which includes the chassis provided by any one of the above embodiments.

For instance, the mobile apparatus provided by the embodiment of the present disclosure may be a wiping robot, e.g., a window cleaning robot or a sweeping robot. The mobile apparatus includes but not limited to the wiping robot and may also be other devices with travelling function.

At least one embodiment of the present disclosure further provides an angle change method of the chassis provided by any one of the above embodiments. The method includes the following steps S1 to S3.

Step S1: detecting an edge of a surface for bearing the chassis and determining the type of the edge.

For instance, in the step, detecting the edge of the surface for bearing the chassis may include: detecting the edge by transmitting a detection signal to the surface and receiving a reflected signal, for instance, through an infrared sensor or a laser radar sensor; or acquiring an image of the surface and detecting the edge according to the image, for instance, through a camera; or detecting the edge according to the fact whether the movement state of the chassis body is blocked, in which, for instance, when the chassis is used in the situation of a recessed shape such as a corner, if the chassis cannot move continuously, it can be determined that the edge in front of the chassis is the edge of the recessed shape such as a corner.

Step S2: rotating the chassis body to adjust the positional relationship between the edge and the gap between the first body and the second body in the chassis.

For instance, as for the edge of a protruding shape, the extension direction of the gap between the first body A and the second body B may be adjusted to be roughly perpendicular to the extension direction of the edge at first (as shown in FIG. 4*c*), and subsequently, be adjusted to be roughly parallel to the extension direction of the edge (as shown in FIG. 4*d*).

For instance, as for the edge of a recessed shape, the extension direction of the gap between the first body A and the second body B may be adjusted to be roughly parallel to the extension direction of the edge (as shown in FIG. 7*b*).

Step S3: changing the angle between the bottom surface of the first body and the bottom surface of the second body according to the type of the edge.

For instance, as for the edge of the protruding shape, as shown in FIG. 3*c*, the angle between the bottom surfaces of the first body A and the second body B may be adjusted by allowing the bottom surfaces of the first body A and the second body B to be close to each other; and as for the edge of the recessed shape, as shown in FIG. 6*b*, the angle between the bottom surfaces of the first body A and the second body B may be adjusted by allowing the support surfaces of the first body A and the second body B to be close to each other.

For instance, as for the edge of the recessed shape, before the chassis body arrives at the edge (namely before the chassis overlaps the edge), the angle between the first body A and the second body B may be adjusted (as shown in FIG. 6*b*); or as for the edge of the protruding shape, after the chassis body arrives at the edge, the chassis body is rotated, so that the edge can be disposed between the first body A and the second body B and the extension direction of the edge can be roughly consistent with the extension direction of the gap (as shown in FIG. 4d), and hence the angle between the first body A and the second body B can be adjusted (as shown in FIG. 3c).

Figure 8:
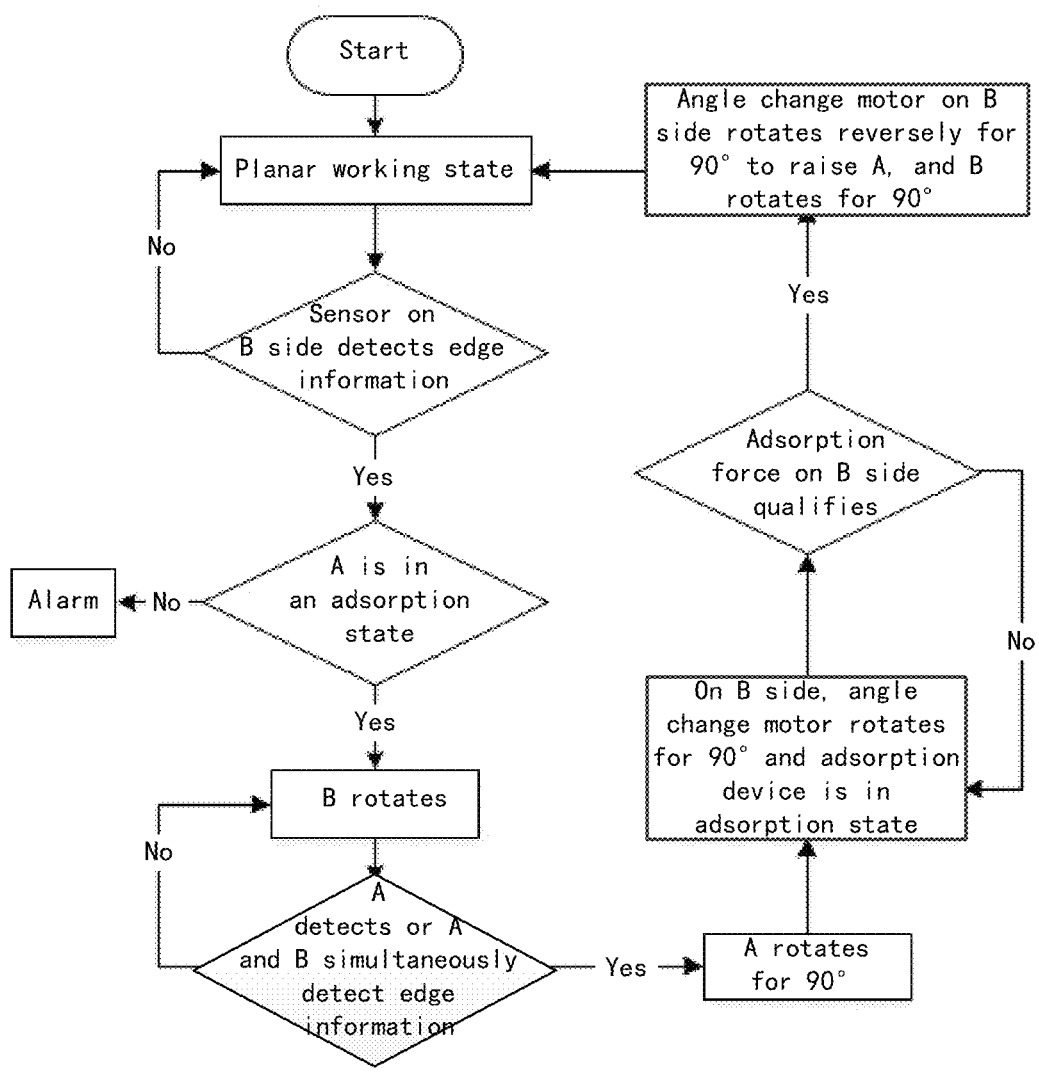
FIG. 8 is a flow diagram of an angle change method provided by an embodiment of the present disclosure when applied at the edge of the protruding shape.

For instance, as for the edge of the protruding shape, the method provided by an embodiment of the present disclosure may include the following steps S81 to S89. Description will be given below with reference to FIG. 8.

Step S81: starting the chassis.

Step S82: allowing the chassis to be in the planar working state, as shown in FIG. 4a.

Step S83: determining whether the sensor on the B side detects edge information or not. If the sensor on the B side does not detect the edge information, the process returns to the previous step. If the sensor on the B side detects the edge information, it indicates that the chassis moves to the state as shown in FIG. 4b.

Step S84: determining whether A is in the adsorption state. If A is not in the adsorption state, an alarm is given out. If A is in the adsorption state, the adsorption states of A and B are switched, so that A can be in the non-adsorption state and B can be in the adsorption state.

Step S85: starting the steering device on the B side to drive B to rotate.

Step S86: determining whether the sensor on the A side detects edge information or not, and determining whether the sensors respectively on the A and B sides detect the edge information or not. If the sensors respectively on the A and B sides cannot simultaneously detect the edge information, the process returns to the previous step. If the sensors respectively on the A and B sides can simultaneously detect the edge information, it indicates that the chassis is in the state as shown in FIG. 4c.

Step S87: starting the steering device on the A side to drive A to rotate (planar rotation) for 90 DEG, so that B can rotate for 90 DEG around the rotation center of A, and hence the chassis can be in the state as shown in FIG. 4d.

Step S88: allowing the angle change motor on the B side to rotate (vertical rotation) for 90 DEG, and starting the adsorption device on the B side to adsorb B onto the surface, so that the chassis can be in the state as shown in FIG. 3c.

Step S89: determining whether the adsorption force on the B side satisfies the requirement or not. If not, the process returns to the previous step to control the adsorption device on the B side to adsorb B onto the surface. If so, the angle change motor on the B side reversely rotates (vertical rotation) for 90 DEG, so that both A and the central part of the angle change device rotates for 90 DEG, and hence A and B can be arranged side by side (allowing the chassis to be in the state as shown in FIG. 3d); and subsequently, B is driven to rotate (planar rotation) for 90 DEG, so that A can enter onto another surface for work.

For instance, in the step S89, determining whether the adsorption force is qualified may be implemented by a pressure sensor or a barometer; or detection may be performed by the angle change motor, for instance, when A is still in the adsorption state, the angle change motor on the B side rotates reversely, and if the current of the angle change motor increases and the angle is unchanged, the adsorption force on the B side is qualified.

Figure 9:
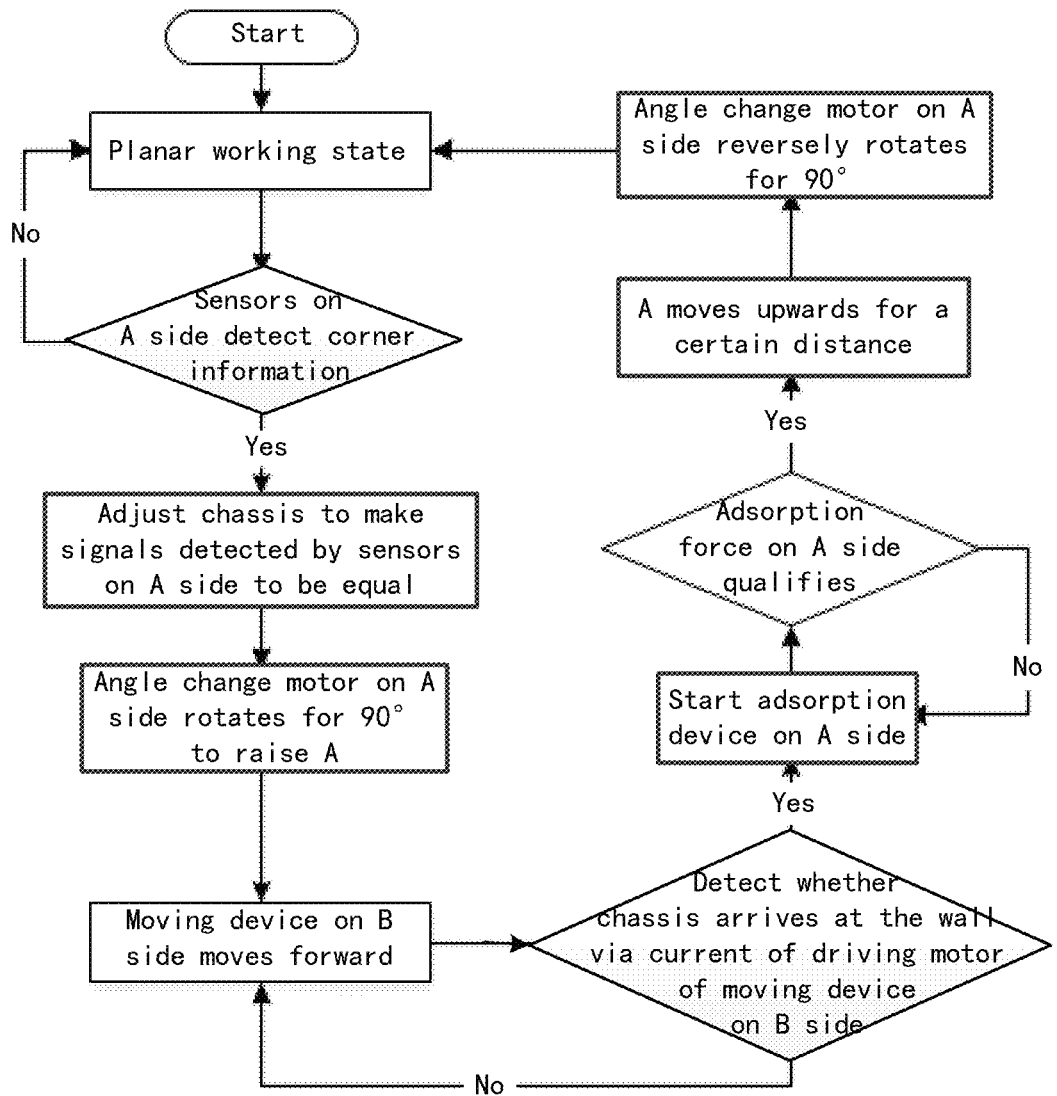
FIG. 9 is a flow diagram of the angle change method provided by an embodiment of the present disclosure when applied at the edge of a corner.

For instance, as for the edge of the recessed shape (taking the edge of the corner as an example), the method provided by an embodiment of the present disclosure may include the following steps S91 to S99. Description will be given below with reference to FIG. 9.

Step S91: starting the chassis.

Step S92: allowing the chassis to be in the planar working state, as shown in FIG. 6a.

Step S93: determining whether a plurality of sensors 400 (as shown in FIG. 7a, also referred to as forward-looking sensors, for instance, two sensors 400 are adopted) on the A side detects corner information or not. If the corner information is not detected, the process returns to the previous step. If the corner information is detected, the state of the chassis is adjusted, so that signals detected by the plurality of sensors 400 on the A side can be equal, and hence the chassis is driven to move to the state as shown in FIG. 7b.

Step S94: allowing the angle change motor on the A side to rotate (vertical rotation) for 90 DEG, and raising A so that the chassis can be in the state as shown in FIG. 6b.

Step S95: allowing the chassis to move forwards through the moving device on the B side.

Step S96: determining whether the chassis moves to the wall through, for instance, the current of the driving motor of the moving device on the B side. If not, the process returns to the previous step; and if so, it indicates that the chassis moves to the state as shown in FIG. 6c.

Step S97: starting the adsorption device on the A side.

Step S98: determining whether the adsorption force of the adsorption device on the A side satisfies the requirement or not. If not, the process returns to the previous step; and if so, A is driven by the moving device on the A side to move upwards for a certain distance, so that the chassis can move to the state as shown in FIG. 6d.

Figure 6E:
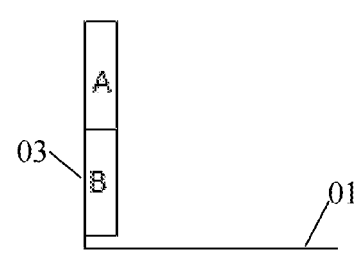

Step S99: allowing the angle change motor on the A side to reversely rotate (vertical rotation) for 90 DEG, so that both A and the central part of the angle change device can rotate for 90 DEG, and hence the chassis can restore the planar working state, as shown in FIG. 6e.

The above embodiments of the mobile apparatus, the chassis of the mobile apparatus and the angle change method for the chassis can be referred to each other. Besides, in the case of no conflict, the features of the embodiments and the embodiments of the present disclosure may be combined with each other.

What are described above is related to the illustrative embodiments of the disclosure only and not limitative to the scope of the disclosure; the scopes of the disclosure are defined by the accompanying claims.

This application claims the benefit of Chinese Patent Application No. 201610847014.6, filed on Sep. 23, 2016, which is hereby entirely incorporated by reference as a part of the present application.

What is claimed is:

1. A chassis for a mobile apparatus, comprising:
   a chassis body, comprising a first body and a second body, wherein the first body comprises a bottom surface and a support surface arranged opposite to each other, and the second body comprises a bottom surface and a support surface arranged opposite to each other;
   an angle change device, respectively connected with the first body and the second body and disposed between the first body and the second body in an arrangement direction of the first body and the second body, wherein the angle change device is configured to change an angle between the bottom surface of the first body and the bottom surface of the second body; and
   a moving device, configured to move the chassis body; wherein the angle change device comprises:
   a central part disposed between the first body and the second body and respectively connected with the first body and the second body, wherein the central part comprises a first central part engaging piece which is on a side, facing the first body, of the central part;

a first body engaging piece which is connected with the first body and is in a transmission connection with the first central part engaging piece; and a first angle change motor, configured to drive one of the first central, part engaging piece and the first body engaging piece to rotate, so that the first body rotates around the central part, and hence the angle between the bottom surface of the first body and the bottom surface of the second body changes.

2. The chassis according to claim 1, wherein the angle change device further comprises a connection gear which is disposed between the first body engaging piece and the first central part engaging piece and respectively engaged with the first body engaging piece and the first central part engaging piece.

3. The chassis according to claim 1, wherein the central part further comprises a second central part engaging piece which is on a side, facing the second body, of the central part; and the angle change device further comprises:

a second body engaging piece which is connected with the second body and is in a transmission connection with the second central part engaging piece; and a second angle change motor configured to drive one of the second central part engaging piece and the second body engaging piece to rotate, so that the second body rotates around the central part, and hence the angle between the bottom surface of the first body and the bottom surface of the second body changes.

4. The chassis according to claim 1, wherein the moving device comprises:

a first adsorption device and first steering device which are at the first body; and a second adsorption device and a second steering device which are at the second body, wherein the first steering device is configured to allow the first body to rotate around a rotation axis of the first steering device, and the rotation axis of the first steering device is perpendicular to the, bottom surface of the first body; and the second steering device is configured to allow the second body to rotate around a rotation axis of the second steering device, and the rotation axis of the second steering device is perpendicular to the bottom surface of the second body.

5. The chassis according to claim 4, wherein the first steering device comprises a first steering motor, a first transmission part driven by the first steering motor, and a first center transmission part driven by the first transmission part; and the rotation axis of the first steering device is at a center of the first center transmission part.

6. The chassis according to claim 5, wherein the first transmission part comprises a worm and the first center transmission part comprises a worm wheel; or the first transmission part comprises a gear wheel and the first center transmission part comprises another gear wheel.

7. The chassis according to claim 4, wherein the second steering device comprises a second steering motor, a second transmission part driven by the second steering motor, and a second center transmission part driven by the second transmission part; and the rotation axis of the second steering device is at a center of the second center transmission part.

8. The chassis according to claim 4, further comprising a first sensor region at the first body and a second sensor region at the second body, wherein each of the first sensor region and the second sensor region is provided with a sensor.

9. The chassis according to claim 8, wherein a planar shape of the first sensor region is a circular arc, and a center of the circular arc is at the rotation axis of the first steering device; and/or a planar shape of the second sensor region is a circular arc, and a center of the circular arc is at the rotation axis of the second steering device.

10. The chassis according to claim 8, wherein the sensor in each of the first sensor region and the second sensor region is an infrared sensor, a laser radar sensor or a camera.

11. The chassis according to claim 1, wherein the moving device comprises a roller structure or a conveyer belt structure, which is at the chassis body.

12. The chassis according to claim 11, wherein the roller structure comprises at least one first roller and at least one second roller, the first roller is at the first body, and the second roller is at the second body; and the conveyer belt structure comprises at least one first conveyer belt and at least one second conveyer belt, the first conveyer belt is at the first body, and the second conveyer belt is at the second body.

13. The chassis according to claim 11, further comprising an adsorption device, wherein the adsorption device is configured to adsorb the chassis body and a surface for supporting the chassis body together.

14. The chassis according to claim 1, further comprising a sensor, wherein the sensor is at the chassis body.

15. A mobile apparatus, comprising the chassis according to claim 1.

16. An angle change method for the chassis according to claim 1, comprising:

detecting an edge of a surface for supposing the chassis and determining a type of the edge;

rotating the chassis body to adjust a positional relationship between the edge and a gap between the first body and the second body; and changing the angle between the bottom surface of the first body and the bottom surface of the second body according to the type of the edge.

17. The method according to claim 16, wherein the angle between the first body arid the second body changes before the chassis body arrives at the edge; or the chassis body is rotated after the chassis body arrives at the edge, so that the edge is between the first body and the second body and that an extension direction of the edge is consistent with an extension direction of the gap, and then the angle between the first body and the second body changes.

18. The method according to claim 16, wherein detecting the edge comprises:

detecting the edge by sending a detection signal to the surface and receiving reflected signal; and/or acquiring an image of the surface and detecting the edge according to the image; and/or detecting the edge according to a fact whether movement of the chassis body is blocked.

19. The chassis according to claim 2, wherein the central part further comprises a second central part engaging piece which is on a side, facing the second body, of the central part; and the angle change device further comprises:

a second body engaging piece which is connected with the second body and is in a transmission connection with the second central part engaging piece; and a second angle change motor configured to drive one of the second central part engaging piece and the second body engaging piece to rotate, so that the second body rotates around the central part, and hence the angle between the bottom surface of the first body and the bottom surface of the second body changes.

* * * * *

UNITED STATES PATENT AND TRADEMARK OFFICE
CERTIFICATE OF CORRECTION

| | | |
|---|---|---|
| PATENT NO. | : 10,213,084 B2 | Page 1 of 1 |
| APPLICATION NO. | : 15/569261 | |
| DATED | : February 26, 2019 | |
| INVENTOR(S) | : Ying Zhang et al. | |

It is certified that error appears in the above-identified patent and that said Letters Patent is hereby corrected as shown below:

On the Title Page

Item (30), add:
-- (30) Foreign Application Priority Data
September 23, 2016 (CN) ............................... 201610847014.6 --

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*